United States Patent [19]
Grunsted et al.

[11] Patent Number: 5,836,494
[45] Date of Patent: Nov. 17, 1998

[54] VEHICULAR CARGO CARRIER ASSEMBLY

[75] Inventors: Michael P. Grunsted, 1555 Deerfield Dr., Oshkosh, Wis. 54904; Peter M. Schingen; Paul R. Walker, both of Winnebago County, Wis.

[73] Assignee: Michael P. Grunsted, Oshkosh, Wis.

[21] Appl. No.: 801,848

[22] Filed: Feb. 21, 1997

[51] Int. Cl.[6] .................................................. B60R 9/06
[52] U.S. Cl. ........................... 224/521; 224/495; 224/524
[58] Field of Search ................... 224/511, 519, 224/521, 524, 523, 504, 495

[56] References Cited

U.S. PATENT DOCUMENTS

| | | | |
|---|---|---|---|
| 4,381,069 | 4/1983 | Kerck | 224/521 X |
| 4,971,509 | 11/1990 | Sechovec et al. | 224/521 X |
| 5,460,304 | 10/1995 | Porter et al. | 224/521 |

FOREIGN PATENT DOCUMENTS 38139  11/1927  Denmark ................................ 224/521

*Primary Examiner*—Renee S. Luebke
*Attorney, Agent, or Firm*—R. Jonathan Peters

[57] ABSTRACT

A carrier assembly for a vehicle having a standard receiver hitch, comprising a receiver bar for connecting the carrier with the receiver hitch, and a plate member depends from and is disposed transversely to the receiver bar. The plate member has a substantially planar facing disposed outwardly from the receiver bar. A retaining member such as a cross-bar or yoke is affixed to the planar facing of said plate member. A generally horizontally disposed platform depends from the support member useful for supporting and transporting a load.

21 Claims, 20 Drawing Sheets

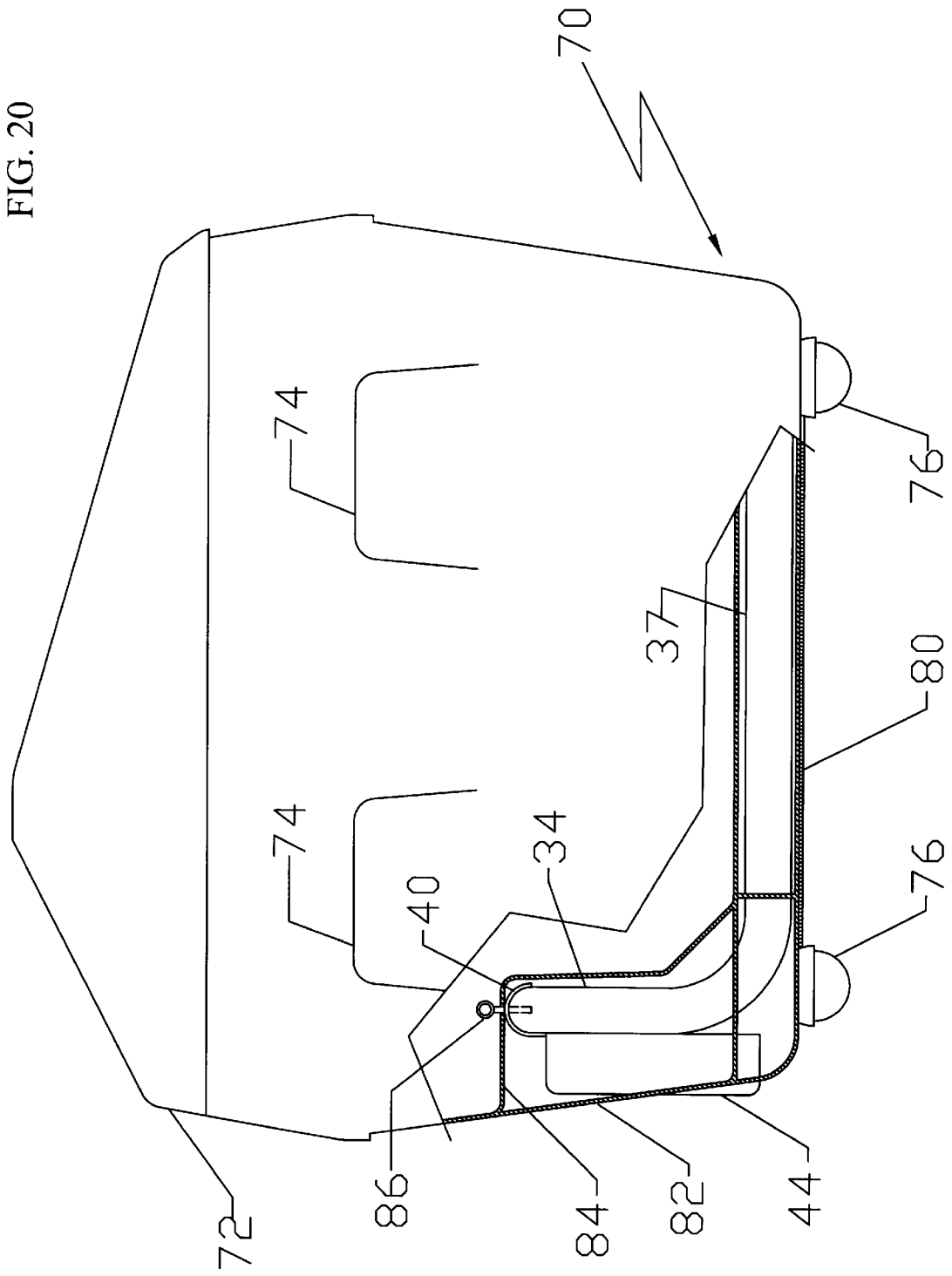

VEHICULAR CARGO CARRIER ASSEMBLY

FIELD OF THE INVENTION

This invention relates to a vehicular cargo carrier assembly for supporting and transporting a load. In a more specific aspect, this invention relates to a vehicular cargo carrier mounted to the rear or front of a vehicle and adapted to receive, support, and transport a load.

BACKGROUND AND PRIOR ART

A variety of designs or systems for cargo carriers attachable to the exterior of motor vehicles have been proposed and many have become commonplace and are in wide use. Most commonly, cargo carriers are connected or coupled to the rear of the vehicle, and typically attached to a trailer hitch or vehicle bumper. One such type of carrier is cantilevered from the bumper or trailer hitch of the vehicle. These tailgate type carriers, disposed outside the vehicle, are versatile, and provide suitable means for transporting extra or bulky loads. Thus, it has long been recognized that a carrier is advantageous in that it provides extra storage capacity for transporting cargo, or increases the carrying capacity of a vehicle such as with today's smaller or more compact vehicles having limited storage capacity, or provides carrying capacity for relatively large, heavy, or bulky items. Because of this carrying capacity, cargo carriers are therefore utilized for supporting and transporting a wide variety of items or materials, such as trunks, luggage, clothing, beverages, food, recreational and sports equipment (e.g., bicycles, skis, and camping equipment), furniture, spare tires, lawn and garden equipment, etc.

Useful types or systems of cargo carriers shown in the prior art mounted on the front or rear of a vehicle are connected to a vehicle receiver hitch or to the bumper and cantilevered therefrom in a substantially horizontal plane. Representative carriers of this type of system are disclosed in U.S. Pat. Nos. 5,439,151; 5,181,822; and 5,460,304. However, such vehicular attachable carriers known or disclosed in the art most typically comprise a mount and an integrally dependent rack, platform, or the like, for supporting and transporting a load. That is, for a carrier of this design or system, a platform depends from, and is integral with, or unique to, the mounting means connected to the hitch or to the bumper. Thus, this type of carrier system is disadvantageous in that the load support means (i.e., carrier) being integral with, or unique to, the mounting means restricts or limits the platform to a design or configuration adaptable or compatible with the mounting apparatus; that is, there is essentially no allowance or margin for utilizing or adapting to the system different types or designs of platform carriers, or to interchanging the system with different types of vehicles (e.g., sedan, truck, van, station wagon, etc.).

Some of the disadvantages of the prior art were overcome, at least to some extent, with the carrier system disclosed in U.S. Pat. No. 5,460,304 comprising a pair of articulated tubular supports telescopically engageable with the trailer hitches. The system includes a first cargo carrier with guide channels for receiving tubular supports, and a second cargo carrier telescopically engaged with opposite ends of the tubular supports. It will be observed that the system requires two trailer hitches, and appears to be cumbersome and complex.

A support apparatus of a motor vehicle tailgate rack is disclosed in U.S. Pat. No. 4,413,761. The support apparatus comprises a back plate, which is attached to a bumper, parallel side walls and a partition forming a socket for the bumper rack in a vertical position, and a bottom wall and parallel side walls define a second socket for a horizontal or vertical bumper rack. The apparatus appears to disclose a relatively complicated connection to the bumper, and is limited to a rack of a specific design or configuration.

U.S. Pat. No. 4,610,458 discloses an apparatus for mounting a carrier having a series of straps attached at one end to the bumper, and extending outwardly to define a horizontal support on which to mount a carrier. This apparatus is limited to a bumper mount.

U.S. Pat. No. 4,971,509 discloses a carrier for handicapped vehicles, comprising a pivotal plate assembly attached to the trailer hitch, but the system is limited to that specific use. Carriers having pivotal features are disclosed in U.S. Pat. Nos. 4,403,716 and 5,454,496, which serve special needs or provide clearance.

This invention has therefore as its purpose to provide a carrier assembly or system secured or mounted to a vehicle to provide a cargo carrier of versatile design and utility not limited or restricted to a particular configuration or to a particular vehicle and adapted to receive and transport a wide variety of loads or cargoes for many different vehicles, including both on-the-road vehicles and off-the-road vehicles, and further adaptable for arranging or connecting modular components.

SUMMARY OF THE INVENTION

In accordance with the present invention, there is provided a cargo carrier for a vehicle having a conventional or standard receiver hitch. Broadly, the apparatus comprises a hitch connecting means adapted for connecting with the receiver hitch, and a mount or plate member generally vertically disposed is affixed to the hitch connecting means. The plate member has, at least over a portion thereof, a substantially planar surface or facing disposed outwardly from the hitch connecting means. Retaining means is affixed to the planar surface of the plate member, and a cargo platform or carrier depends from the retaining means in a generally horizontal plane.

In accordance with a modified embodiment, the plate member comprises first and second plates in abutting relation. Thus, the first plate, being vertically disposed and affixed to the hitch connecting means, has, at least over a portion thereof, a substantially planar surface or facing disposed outwardly from the hitch connecting means. The second plate, generally vertically disposed, is mounted rearward or outward to the first plate, and the second plate has a substantially planar surface, at least over a portion thereof, for substantially adjacent abutment with the planar surface of the first plate. The two plates, having flat mating surfaces contacting each other, are affixed or adjoined at the zone of abutment as by welding, or by mechanical fastening means (e.g., threaded bolts and nuts), or both. A support means for securing or supporting a cargo carrier is affixed to the second plate, and a platform or carrier depends from the plate assembly in a generally horizontal plane.

The plate member, or one or both plates for the plate assembly, can be polygonal, elliptical, or round, and need not be of equal area dimensions. However, in the modification utilizing two plates, the zone of abutment between the two planar surfaces of the plates should be sufficient to provide an adequate and sturdy connection between the two plates sufficient to support a carrier and its intended load. Also, it should be understood that describing the plate or plates as having substantially planar surfaces is not intended to mean that the complete area of each of the plate surfaces is planar, but rather that a sufficient area of each plate is planar to provide mating surfaces and thereby achieve the desired result.

In a preferred embodiment of the invention, the plate member, or two plates if used, are of a generally rectangular configuration, and the outermost facing or surface relative to the hitch is substantially planar. The vertical marginal edges of the two plates about coincide.

As used herein and in the appended claims, the term "carrier" is intended to mean platform, rack support, load receiver, and like means for receiving and transporting a load, and all of these terms are used synonymously and interchangeably.

In a preferred embodiment of the invention, the assembly comprises a horizontally disposed receiver bar, as the hitch connecting means, adaptable for connecting or attaching to a hitch. The receiver bar is affixed as by welding to a vertical receiver plate as the first plate, having a substantially planar surface or facing disposed outward from the receiver bar. A frame plate as the second plate, also being vertically disposed, is provided with a substantially planar surface for mating engagement or abutment with the substantially planar surface of the first plate and over a substantial area of the two plates. As a further modification, the second or frame plate is adjustably mounted to the first or receiver plate, whereby the height of the second plate can be adjusted relative to the receiver bar, or can be adjusted for accommodating the desired level of the cargo carrier, which can vary depending upon such factors as the vehicle model or the carrier design or configuration. Where desired, the two plates may be connected as by a hinge-like means or articulated joint, such as by providing a complementary load bar and slot elements. When such a connection is utilized, the second or frame plate is provided with a horizontal, elongated member such as a rod or bar positioned adjacent to and parallel with the top marginal edge of the frame plate, and the first or receiver plate is provided with spaced transverse members or flanges having aligned slots or recesses to receive the rod and retain the frame plate in abutting relationship with the receiver plate.

The mount or plate assembly is provided with suitable means for securing or supporting a platform or carrier extending transversely therefrom and outwardly or rearwardly from the vehicle in a generally horizontal plane. This coupling or supporting means may comprise a bracket means depending from the plate member (.e.g., frame or second plate), and a carrier is cantilevered from the bracket. The bracket may be formed separately and joined to the outer face of the plate, as by welding, or the bracket may be formed integrally with the plate. Alternatively, a yoke or crosspiece can be affixed to the plate member (e.g., frame or second plate) as by welding, and a generally horizontally disposed carrier means, such as a tubular support assembly, depends transversely from the yoke. This type of carrier would be particularly useful for providing a facile connection of modular components which may be selectively interconnected to increase the load carrying capacity or to accommodate a support rack specific for supporting and transporting certain types of items or equipment such as bicycles or skis.

Where desired, a platform comprising a yoke, having spaced parallel tines extending downwardly and outwardly therefrom, is welded to the outer facing of the plate member (e.g., frame plate). In an alternative embodiment, the yoke comprises a substantially U-shaped tubular frame, with at least a portion of the center section of the frame affixed to the plate, and further having downwardly depending members or legs from which extend spaced parallel tines disposed in a generally horizontal plane thereby forming a cantilevered platform. The free end of each tine is adapted for telescopic and connecting engagement with a modular component, thereby providing an enlarged or extended platform. The yoke and tines can be formed integrally (as a single unit), and the outward extending members of the tines can be of sufficient length to form a platform of sufficient length and strength. Where desired, a case or trunk is provided with elongated channels or tubular receptacles at each bottom edge, and the tines are inserted into the channels, thereby securing the cargo case in place.

BRIEF DESCRIPTION OF THE DRAWINGS

The invention and its advantages will be more readily understood by reference to the following detailed description and exemplary embodiments when read in conjunction with the following drawings, wherein:

FIG. 20 is a side elevation view of the assembly of FIG. 17 partly fragmentary and partly in cross-section to show the details of the connection of the platform with the trunk.

DETAILED DESCRIPTION OF THE INVENTION AND PREFERRED EMBODIMENTS

Figure 1:
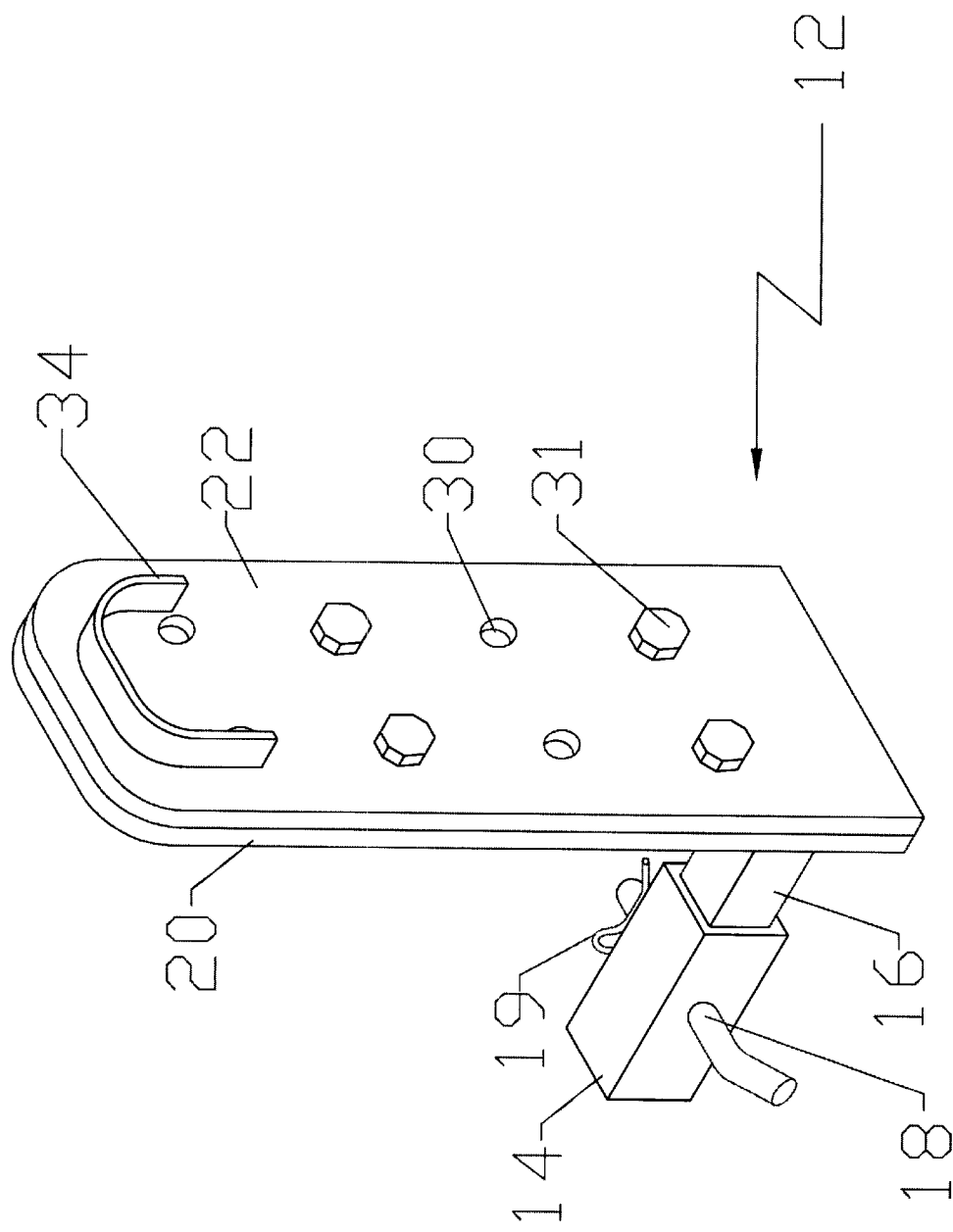
FIG. 1 is a perspective view of a cargo carrier assembly and embodying the features of the present invention.
Figure 2:
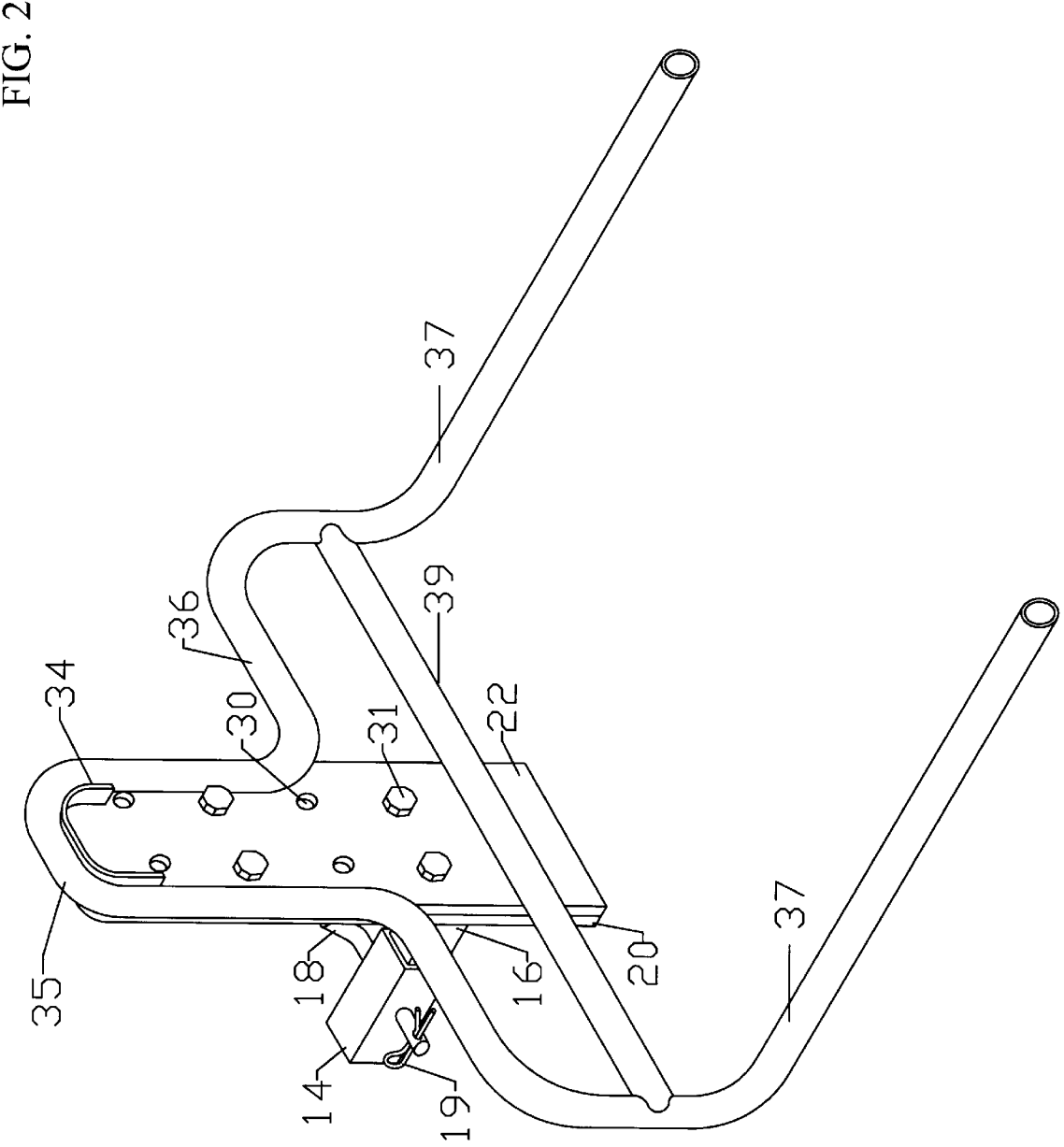
FIG. 2 is an exploded perspective view of the assembly of FIG. 1.

Referring to the drawings, wherein the same reference numerals refer to similar parts throughout the various views, there is shown in FIGS. 1 through 5 a carrier assembly indicated generally by the numeral 12 and embodying the features of the present invention. A carrier assembly of this type is mounted onto a vehicle (not shown) equipped with a conventional or standard trailer tow package, indicated generally by the numeral 13, and having a standard trailer hitch 14. (See FIG. 1.) Although the carrier assembly is described as being mounted to the rear of an automobile, it should be understood that the apparatus is applicable to most any vehicle, including, for example, automobiles, station wagons, vans, jeeps, trucks, snow mobiles, all-terrain vehicles, and the like, and also that the apparatus can be secured to the front of the vehicle. It is significant to note, and will become better understood upon reading of the detailed description, that the cargo carrier, notwithstanding its versatility and adaptability for modular construction, permits access to the automobile, such as in the case of a hatch back, the rear door is accessible, and also does not block the rear view for the driver unless the load is exceptionally high.

In accordance with the embodiment illustrated, a receiver bar 16, as the hitch connecting means, is adapted to be telescopically engaged with a complementary heavy duty, standard trailer hitch 14 attached to the frame rail (not shown), underneath the back of the vehicle. These two members, the trailer hitch and receiver bar, are usually constructed of steel, but any material that can support the load is suitable. As is well known in the art, a trailer hitch 14 is typically tubular defining a longitudinal orifice or cavity, usually of rectangular or square cross-section, and the receiver bar 16 is adapted to mate with (telescopically engage) the orifice of the hitch. The opposed walls of both the hitch and receiver bar have coaxially aligned holes 15 and 17, respectively, adaptable to receive a suitable fastening element. Thus, the receiver bar is attached or fixed to the hitch by conventional means, such as a with a conventional metal pin 18 and clip 19 (e.g., dog-legged pin and spring clip), having a high shear strength inserted through the aligned openings 15 and 17 in the hitch 14 and receiver bar 16. (See FIGS. 1, 2, and 5.) Suitable fastening elements of this type include, for example, a cotter pin or dog-legged pin and spring clip, cable ties, and threaded bolt and nut. Where desired, the receiver bar can be secured to the hitch by a wedge drawn against the receiver by turning an anchored, threaded bolt extending longitudinally through the bore of the receiver bar and of the hitch, so that tightening of the bolt will draw the receiver bar into secure engagement with the hitch, substantially as disclosed in U.S. Pat. No. 5,423,566.

The carrier assembly of our invention includes a mount, and in the embodiment illustrated, is comprised of two generally vertical plates 20 and 22 adjoined at their facings, and disposed rearward or outward of the receiver bar 16. It will be observed that the two plates as illustrated are essentially rectangular, but other area configurations are also applicable, such as elliptical or round, and further it should be understood that both plates need not have the same configuration. A meaningful portion of surfaces 24 and 26 of plates 20 and 22, respectively, are substantially planar so that when the plates are assembled, the planar areas of each surface 24 and 26 abut or contact, and are adjoined in order to provide a secure, fast, and stable attachment, as described herein below in greater detail.

The receiver plate 20, as the first plate, is attached to the receiver bar 16 by any suitable means such as by welding or with a conventional threaded nut and bolt, or pin and clip (described above) extending through a hole in the plate and passing longitudinally through the receiver bar and hitch. In this manner, the plate 20 is vertically disposed and retained in an upright position outwardly from the receiver bar. Also, plate 20 is provided with one or more holes 28, preferably three to six holes, along the central longitudinal axis or in spaced parallel rows and columns.

Figure 3:
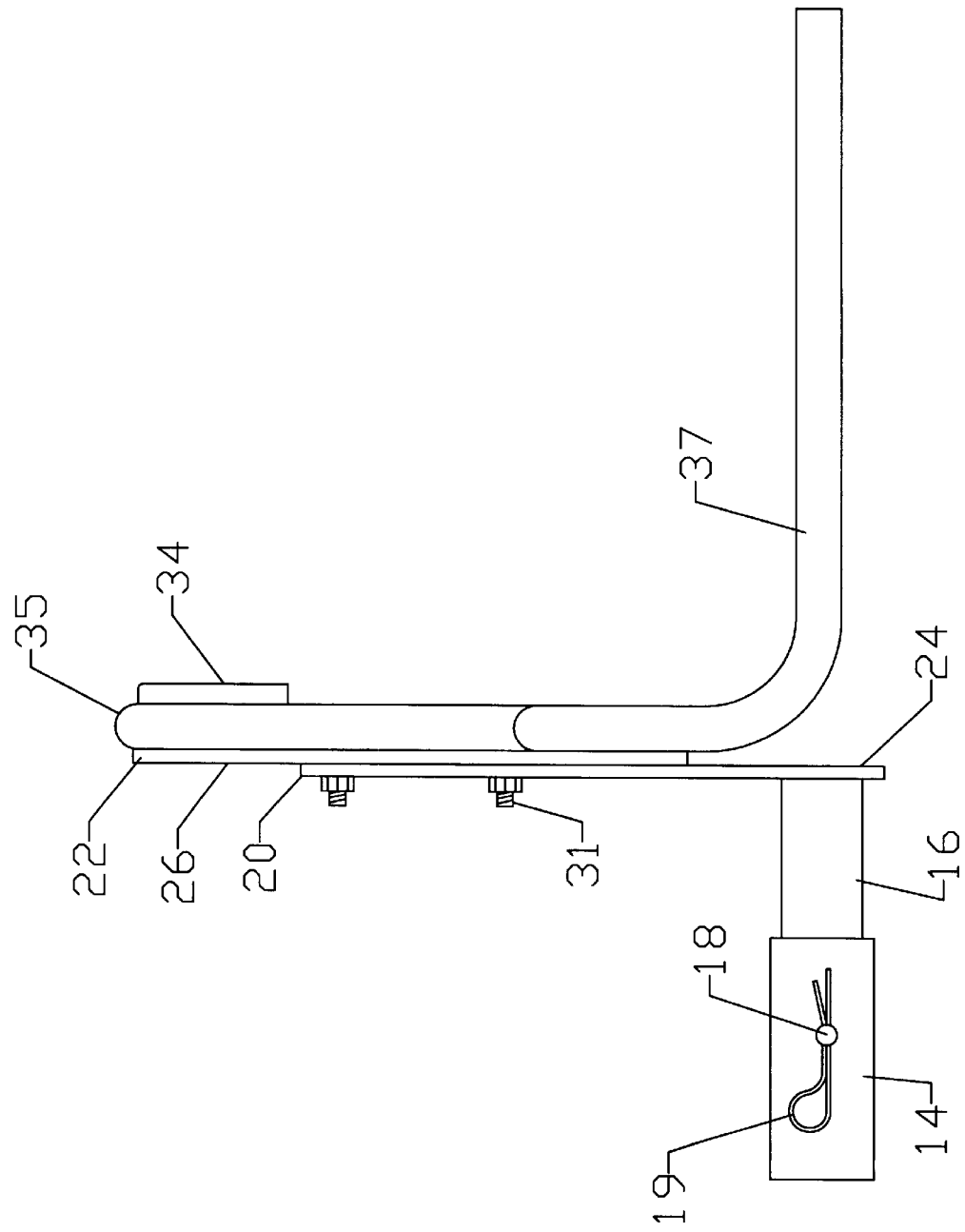
FIG. 3 is a side elevational view of the assembly of FIG. 1.
Figure 4:
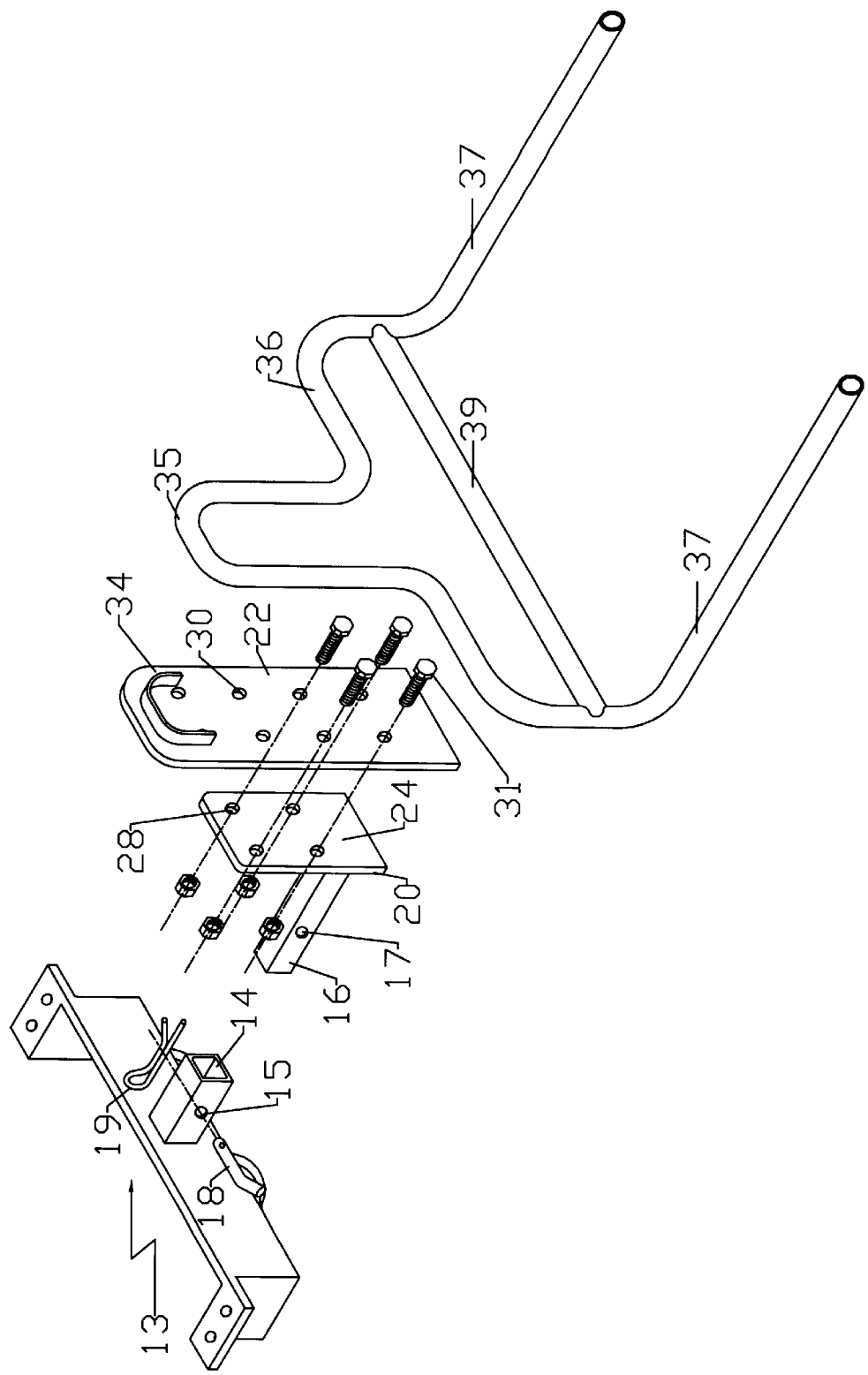
FIG. 4 is a front elevational view of the assembly of FIG. 1.
Figure 5:
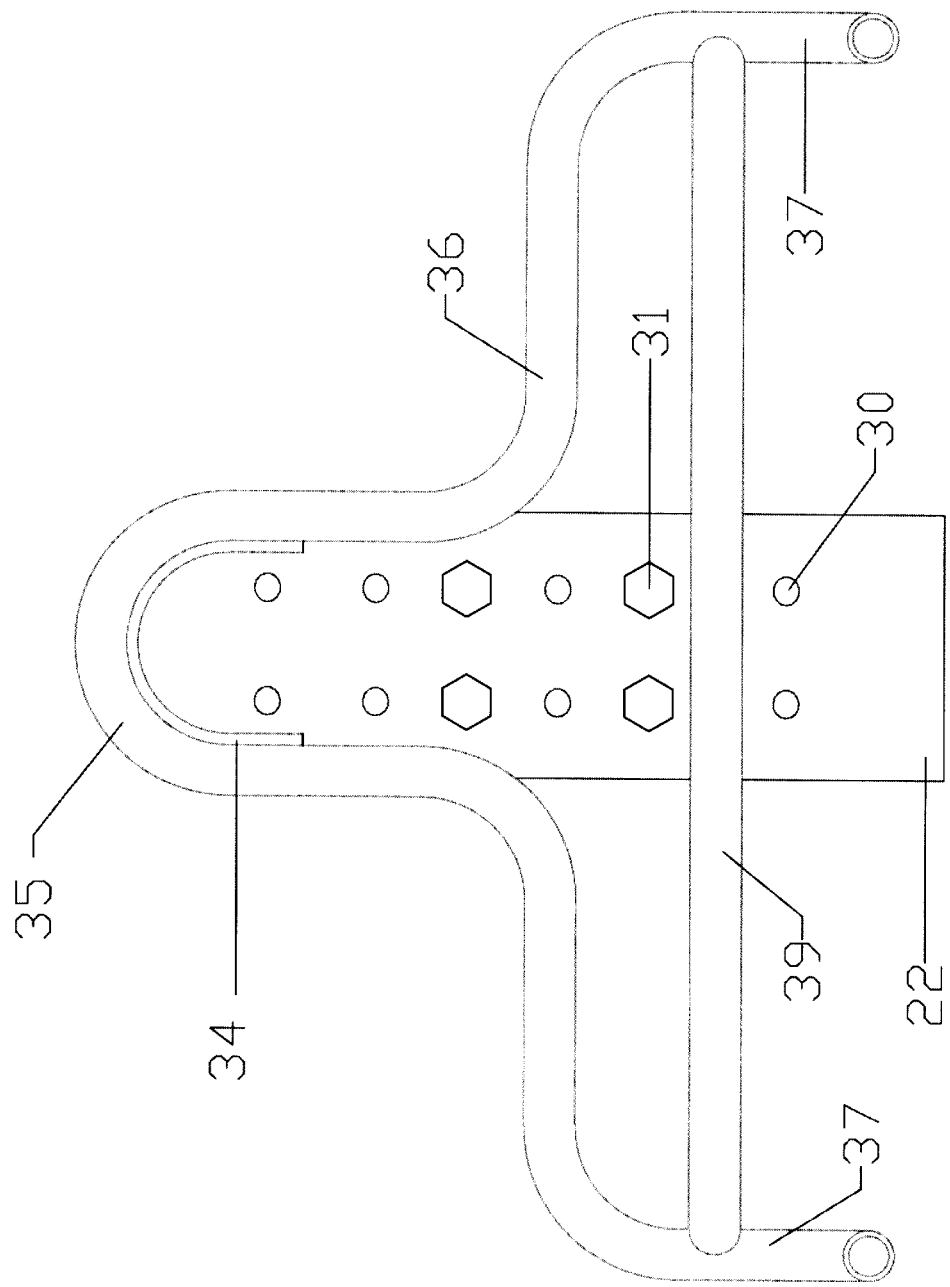
FIG. 5 is a plan view of the assembly of FIG. 1.
Figure 6:
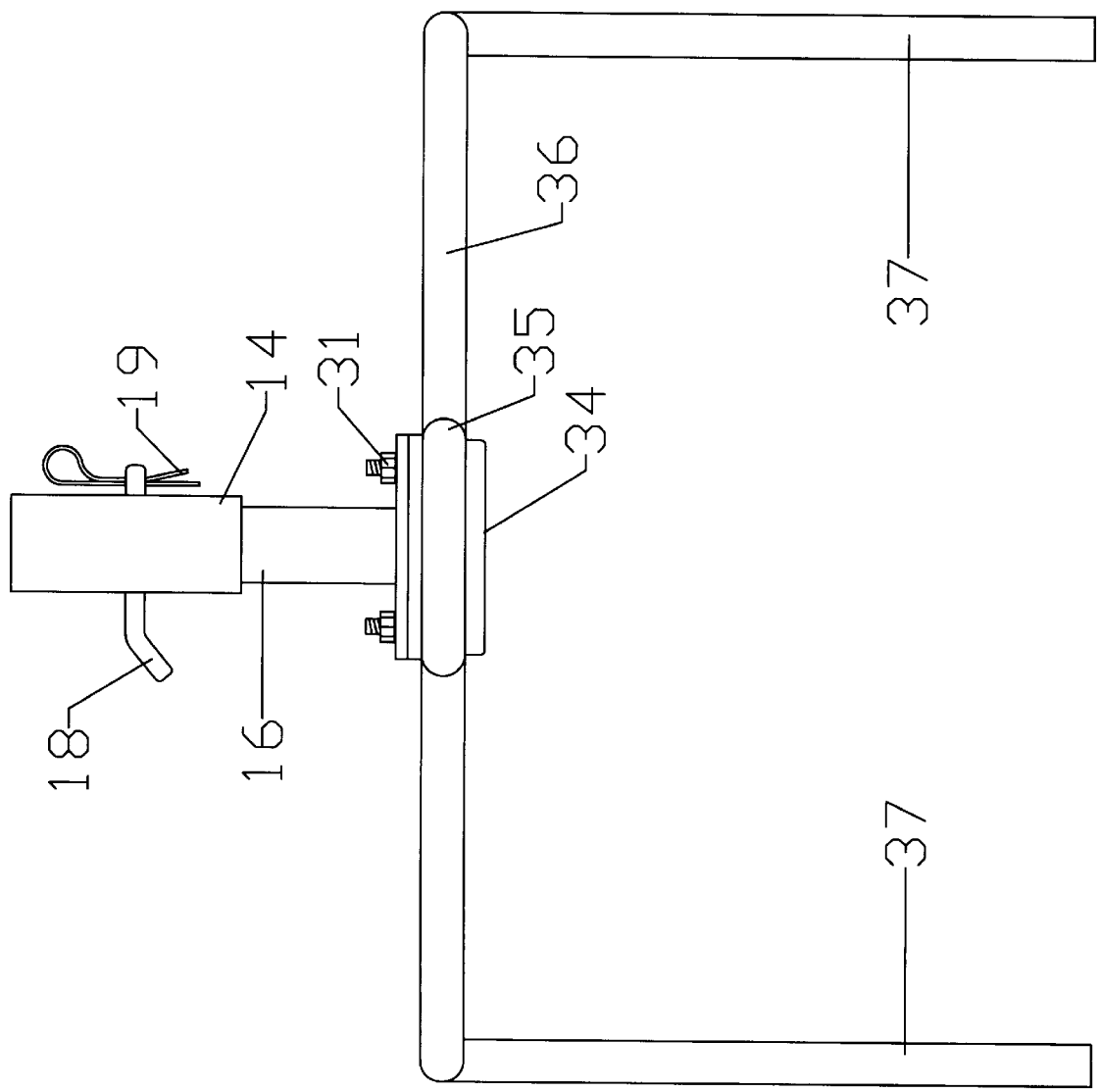
FIG. 6 is a perspective view of a modified form of the carrier assembly falling within the scope of the present invention.
Figure 7:
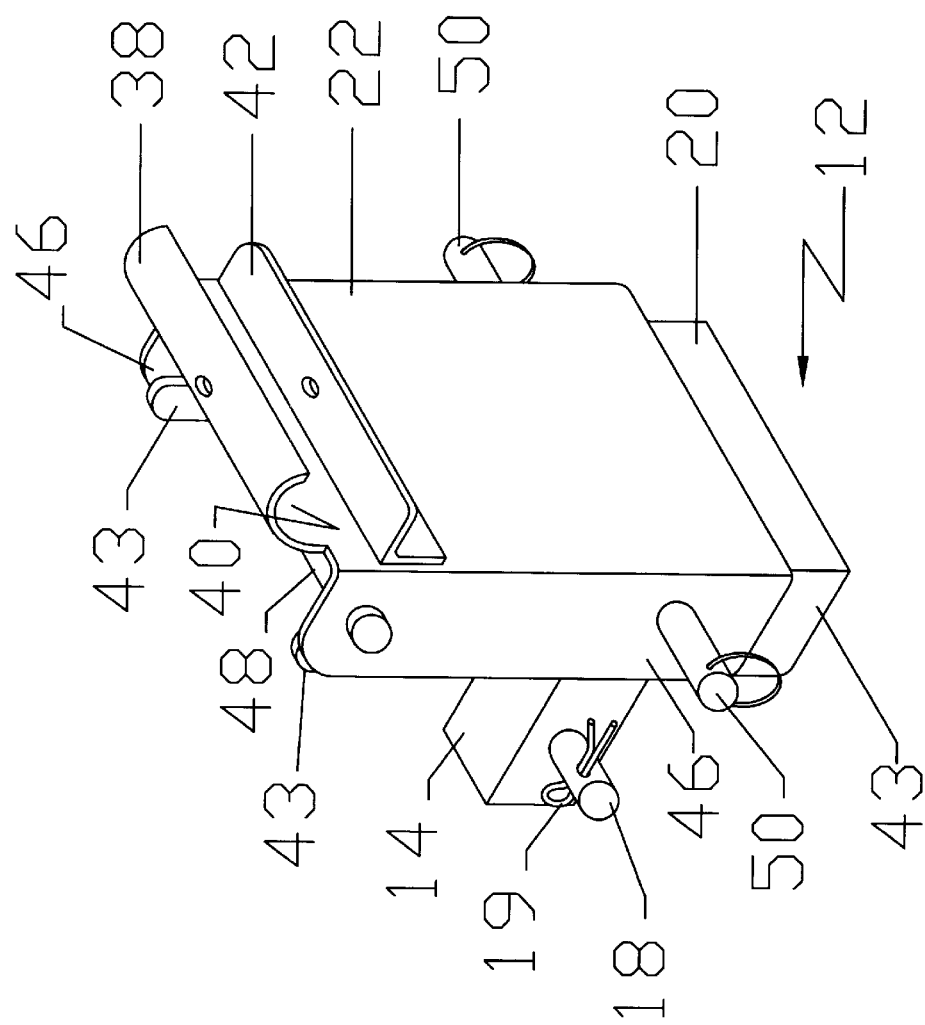
FIG. 7 is a side elevational view of the embodiment shown in FIG. 6.
Figure 8:
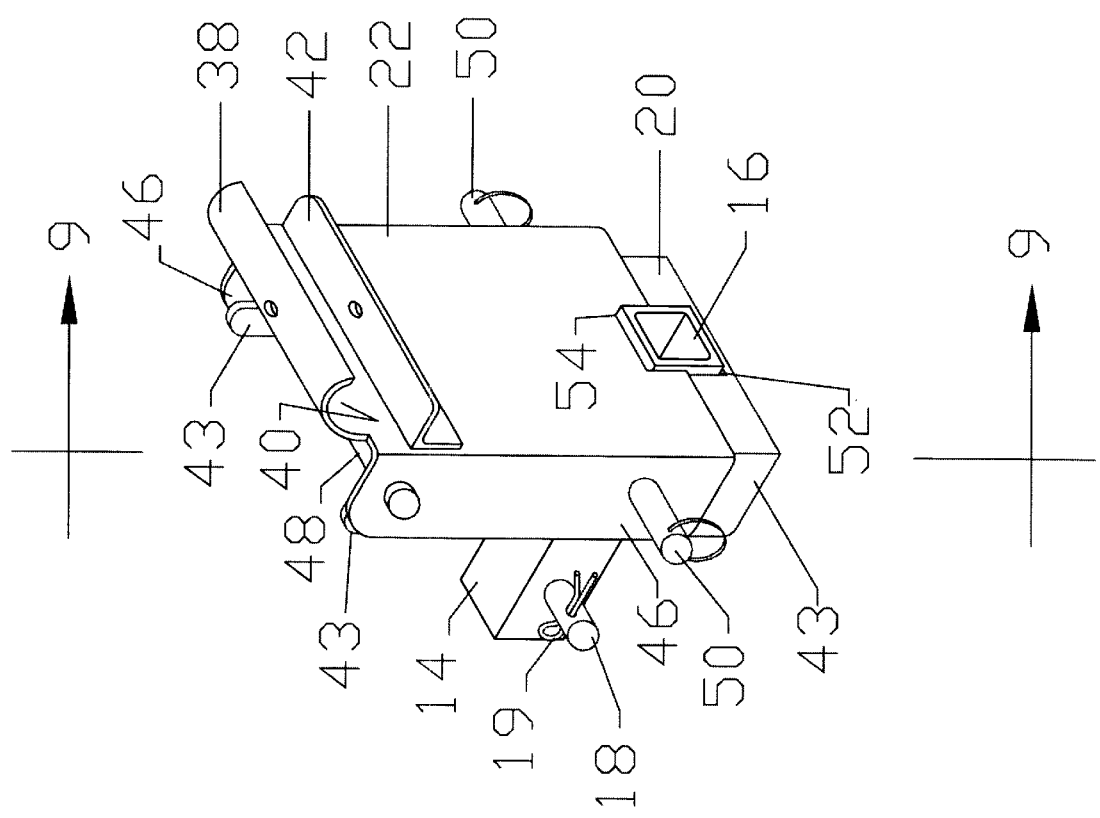
FIG. 8 is a rear elevational view of the embodiment shown in FIG. 6.
Figure 9:
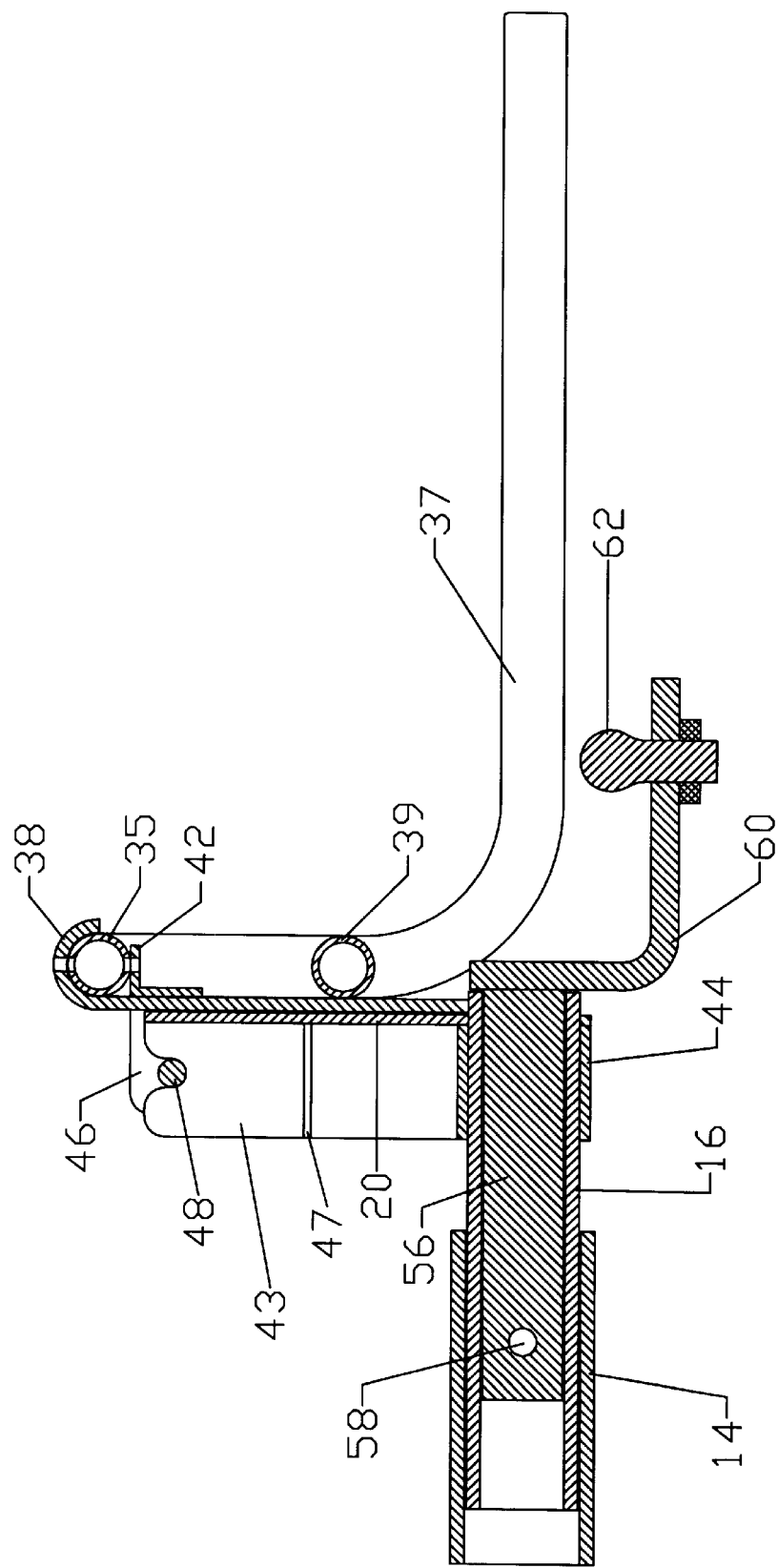
FIG. 9 is a plan view of the embodiment shown in FIG. 6.

The second plate 22, as the frame plate, is affixed in abutting relation to the first plate 20 along the planar surfaces 24 and 26 (see FIG. 3). Plate 22 is provided with one or more securing holes 30, preferably two to eight holes, along its central longitudinal axis, or in spaced parallel rows and columns, and when aligned with a securing hole 28 in plate 20, a connecting element 32 such as a threaded bolt, pin, or the like, is inserted through the aligned holes and attached as with a threaded nut or clip, thereby adjoining the two plates. (See FIGS. 2 and 3.) It is preferable to provide plate 20 with a plurality of securing holes 28, whereby the vertical position of plate 22 can be adjusted by aligning securing holes 30 with pre-selected holes 28 of the desired height. In this manner, the height of the second plate 22 is adjustable relative to the hitch connecting means 16. This adjustable feature can be important where it is desirable or necessary to adjust the height of the plate in order to allow access to the rear of the vehicle such as the hatch back in a station wagon, to provide an adequate rear view for the driver, or to provide greater ground clearance for vehicles that are low to the ground.

Where desired, the first and second plates 20 and 22, respectively, (the receiver plate and frame plate) can be affixed in one position. Thus, the two plates 20 and 22 can be attached at the flat mating surfaces 24 and 26, respectively, in position by one or more threaded bolts or pins inserted through both plates and fixed by nuts threadedly engaged with the bolts or by other suitable means. Where desired, the two plates can be joined by welding, or by a combination of welding and fastening bolts.

A carrier is secured or affixed to the mount and extends outwardly therefrom. That is, a carrier, platform, rack, wheeled platform, or the like, is secured to and extends outwardly from the mount in a generally horizontal plane. In order to connect a carrier to the mount, a suitable retainer means or support means is adjoined to the outer surface or facing of the second plate or frame plate 22, and a carrier is then mounted to the plate and secured and supported by the plate and retainer means. The type and design of the retainer means will depend largely upon the configuration of the carrier and the size and/or weight of the load intended. Suitable retainer means 31 include, for example, a bar, frame, bracket, yoke, crosspiece, a substantially inverted U-shaped yoke or bracket, or the like, affixed to the outer facing of the plate member (e.g., second plate) by any suitable means, such as conventional fastening means, welding, or both. As shown in FIG. 1, the retainer means comprises bracket 33 and yoke 34. Preferably, the yoke comprises a substantially U-shaped tubular frame having a substantially horizontal center section and downwardly depending parallel members or legs 35 and lateral extensions 36, from which depend spaced parallel tines or rails 37 extending outwardly and horizontally from the plate. As shown in the drawings, the yoke is supported, at least in part, by the inverted U-shaped bracket 33 so that the horizontal mid-section and downward legs of the yoke abut the bracket and are adjoined thereto. Further, these members are affixed to the plate as by welding. It should be understood, however, that the bracket 33 may be omitted, and the yoke being affixed to the plate will be sufficient to retain and support the carrier platform. It will be observed that the tines 37 are of sufficient length and size to serve as a rack, platform or carrier. Preferably, at least one horizontal brace extends between the tines about adjacent the lower marginal edge of the plate, and abuts the plate and is welded thereto in order to strengthen the connection. The platform member or tines preferably are open-ended or tubular, and a second, separate carrier platform, indicated generally by the numeral 38, (see FIGS. 15 and 16) may be connected thereto in order to extend or expand the size and capacity of the carrier, which modification is described below in greater detail. Although the platform members or tines are depicted as circular in cross-section, these members can be rectangular, e.ge., square,. However, the circular tines are advantageous in achieving a telescopic engagement with modular components, and additionally are easier to bend. Where desired, the carrier may be strengthened by one or more braces or struts 39 extending between the tines. It is preferable to provide at least one horizontal brace between the tines and in abutment with the face of the frame plate, and affixed thereto, thereby strengthening the yoke connection.

In accordance with the modifications illustrated in FIG. 6–16, the upper marginal edge of the second plate 22 terminates with an outwardly struck, downwardly opened bracket or flange 40 forming a channel or recess 41 having a substantially U-shape or concave configuration. Where desired, a horizontally disposed bracket 42 is arranged below and spaced from the channel 41. A yoke 34, or other suitable retainer means as described above, is supported from beneath by the bracket 42, and is contoured so that channel 41 accommodates member 34 so as to be further supported and retained in position by bracket 42. Accordingly, upon assembly, yoke 34 is inserted into the channel 41 and rests on bracket 42, and the yoke member 34 is then connected to the second plate 22 as by welding and/or by threaded nuts and bolts. In a preferred embodiment, the receiver plate 20 has substantially parallel side flanges or panels 44 and a bottom flange or panel 45 formed perpendicularly to the plate at the marginal edges thereof, and the opposed flanges 44 are provided with coaxially aligned recesses 46. A strut or brace 43 extends between the flanges 44 to strengthen the structure. The frame plate has substantially parallel side flanges or panels 47 formed integrally at the marginal edges thereof, and a horizontal rod 48 extends between and is supported by the two panels. The receiver plate and the frame plate are appropriately sized, in that the outside dimensions of the receiver plate are slightly smaller than the inside dimension between flanges of the frame plate, so that the frame plate will nest with the receiver plate, and with the planar surfaces of each plate being in abutting engagement. In this manner, the rod 48 is hung or suspended from the recesses 46 in the side panels 44 of the plate 20, thereby providing a hinge-like connection or articulated joint between the two plates. The side flanges of both plates have coaxially aligned holes 49, and when the plates are connected and nested, the fastening element 50 is passed through the holes in order to secure the plates. As described above, yoke member 34 includes laterally and horizontally projecting tines, which may project sufficiently outward from the second plate 22 to adequately serve as a platform or rack. Where desired, one or more cross-members or braces 39 extend between the tines in order to strengthen the platform, and the number of cross-members will depend largely on the length of the platform. If the tines are relatively short, and it is desirable to increase the length of the carrier, the tines may be telescopically engaged with tubular ends of a second carrier 38, described below in detail.

It will be observed that with respect to the modifications shown in FIGS. 6–16, the frame plate 22 can be readily removed or detached from the receiver plate 20 when the carrier is not in use without the need for disassemblying or removing the complete carrier assembly from the trailer hitch. Member 34 (e.g., yoke) is affixed to, or integral with, the frame plate, from which extends or projects a carrier platform, and therefore it is possible to remove the frame plate with the carrier. The other components (i.e., the receiver plate, receiver bar, and trailer hitch) remain in place, that is attached to the frame rail of the vehicle, and when there is a need to use the carrier, the frame plate (with the carrier) is simply re-connected to the receiver plate.

Figure 10:
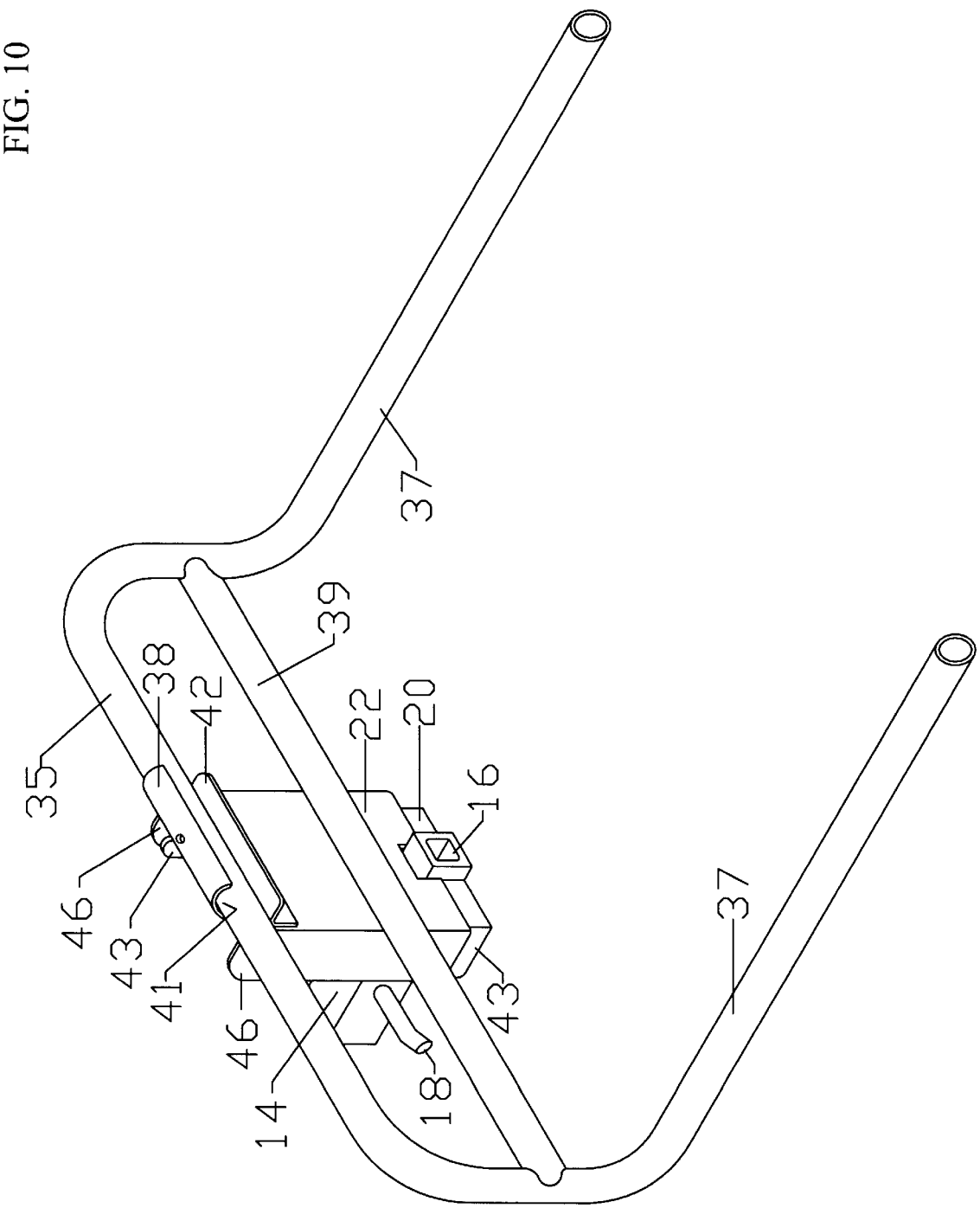
FIG. 10 is a perspective view of another modification of the carrier assembly showing a means for a second hitch connection.
Figure 11:
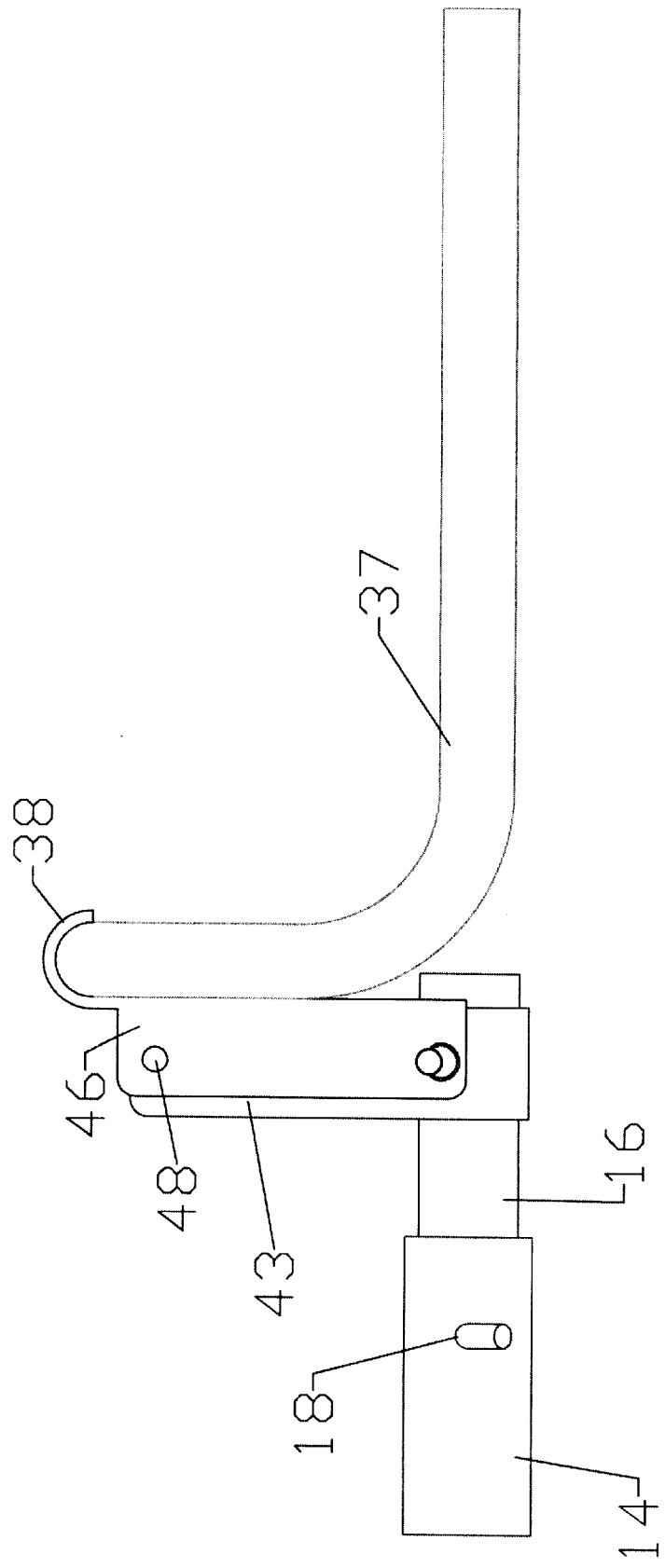
FIG. 11 is an exploded perspective view of the embodiment shown in FIG. 10 showing the second hitch connection.
Figure 12:
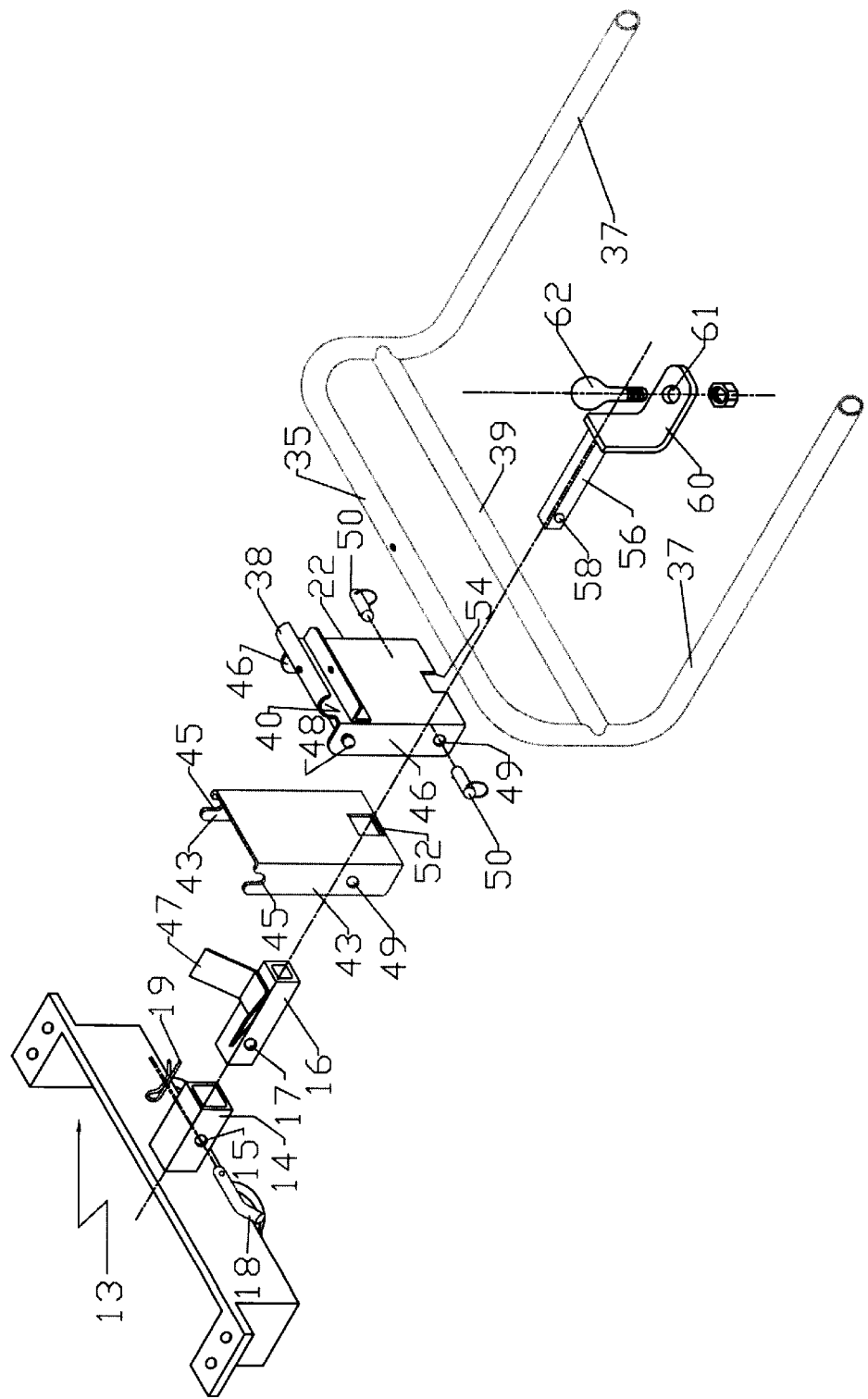
FIG. 12 is a front elevational view of the embodiment shown in FIG. 10.
Figure 13:
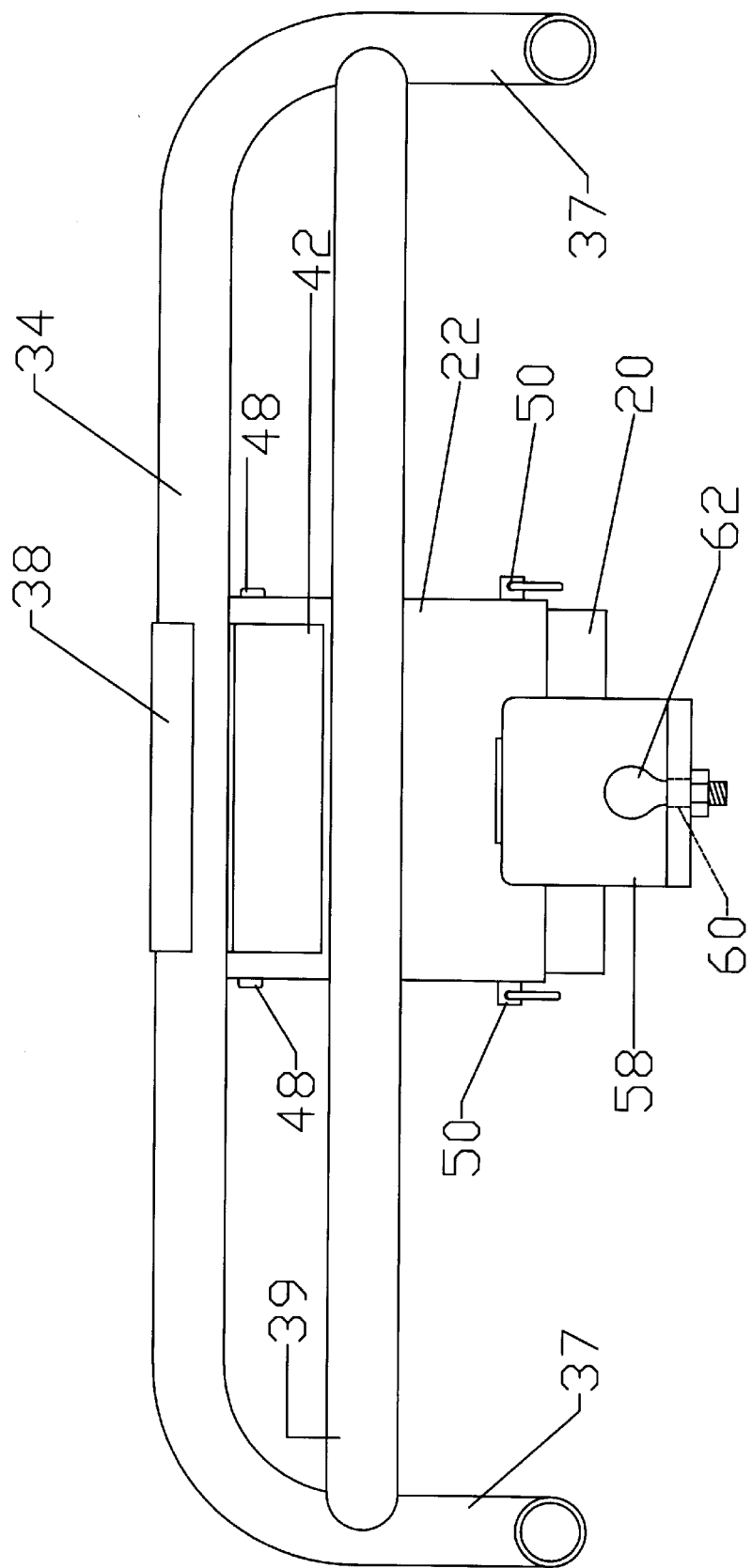
FIG. 13 is a sectional view taken on line 13—13 of FIG. 8.
Figure 14:
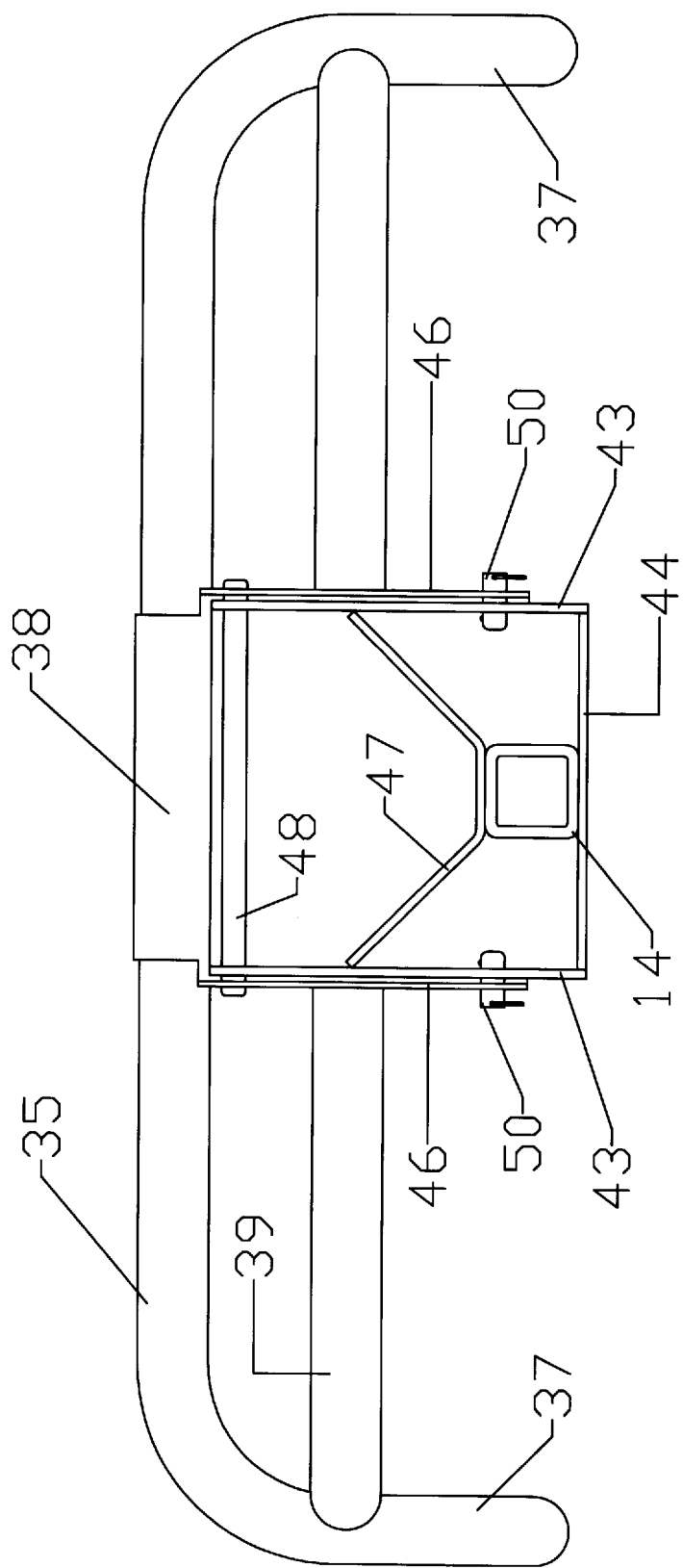
FIG. 14 is a sectional view taken on line 14—14 of FIG. 12.

In another modification of the invention, a second carrier, such as a conventional trailer, can be connected to the mount. As shown in FIGS. 10 and 11, the mount is modified to provide an opening in alignment with the longitudinal opening in the receiver bar 16 and trailer hitch 14. Thus, the first plate or receiver plate 20 and the second plate or frame plate 22 are provided with slots or apertures 52 and 54, respectively, which align when the two plates are in abutting engagement and further align with the longitudinal orifices or openings in the trailer hitch 14 and receiver bar 16, and the receiver bar protrudes through the aligned apertures. Preferably, apertures 52 and 54 are centrally disposed at the lower marginal edge of each plate. Rigid member 56, such as a second trailer hitch or rack, having a tongue 58 with a hole 60 such as for accommodating a conventional trailer hitch ball 62, is adapted to telescopically engage with the tubular receiver bar 16. The opposed walls of hitch 14 and receiver bar 16 have coaxially aligned holes 15 and 17, respectively. Rigid member 56 is inserted into the orifice of the receiver bar and hitch to bring all the holes 15, 17 and 58 into alignment, and a pin and clip, or other suitable fastening means, is passed through the holes to join or connect the members. The lateral tongue 60 protrudes beyond the plate 22, and a conventional trailer hitch ball 62, or other suitable connecting means, can be attached to the tongue. A conventional trailer (not shown) can be connected to the hitch ball 62, which will be in addition to the platform carrier. Because the hitch ball 62 is below the platform carrier, the second carrier will not interfere with the platform.

Figure 15:
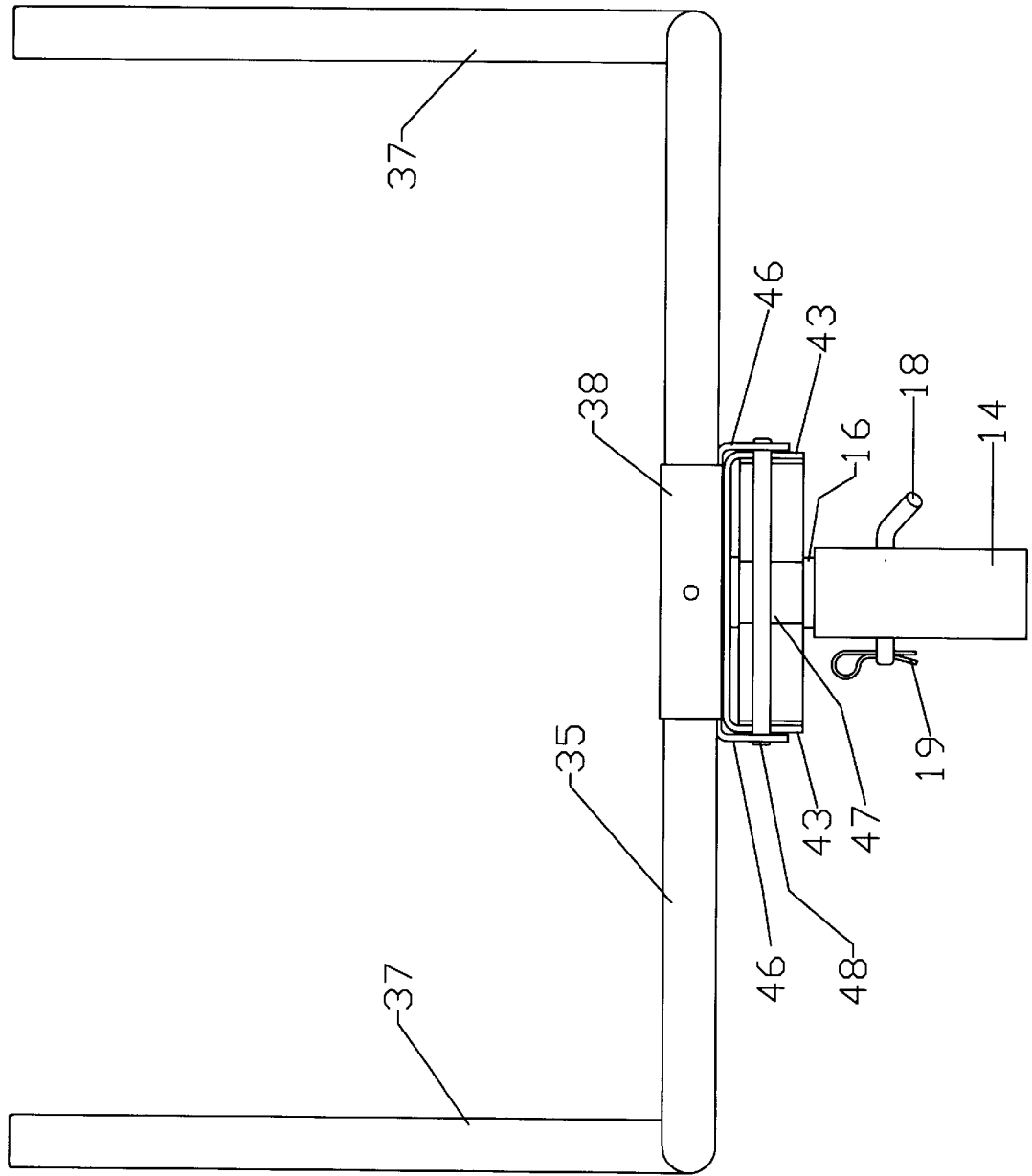
FIG. 15 is a perspective view of the embodiment of the type of FIG. 1 and further showing a modular component for extending the carrier platform.
Figure 16:
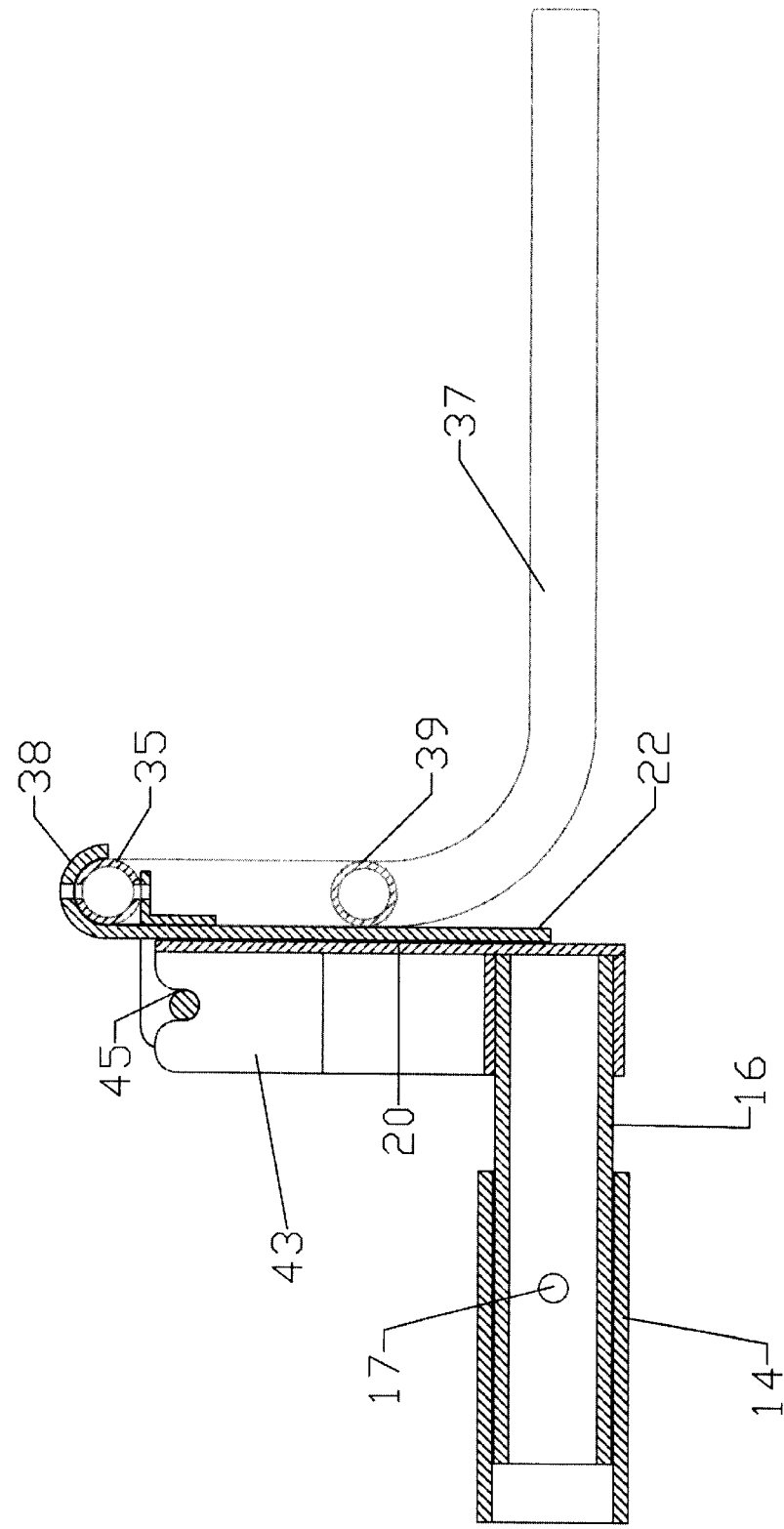
FIG. 16 is a perspective view of the type of carrier assembly of FIG. 15 and modified to show racks for supporting additional equipment or items.
Figure 17:
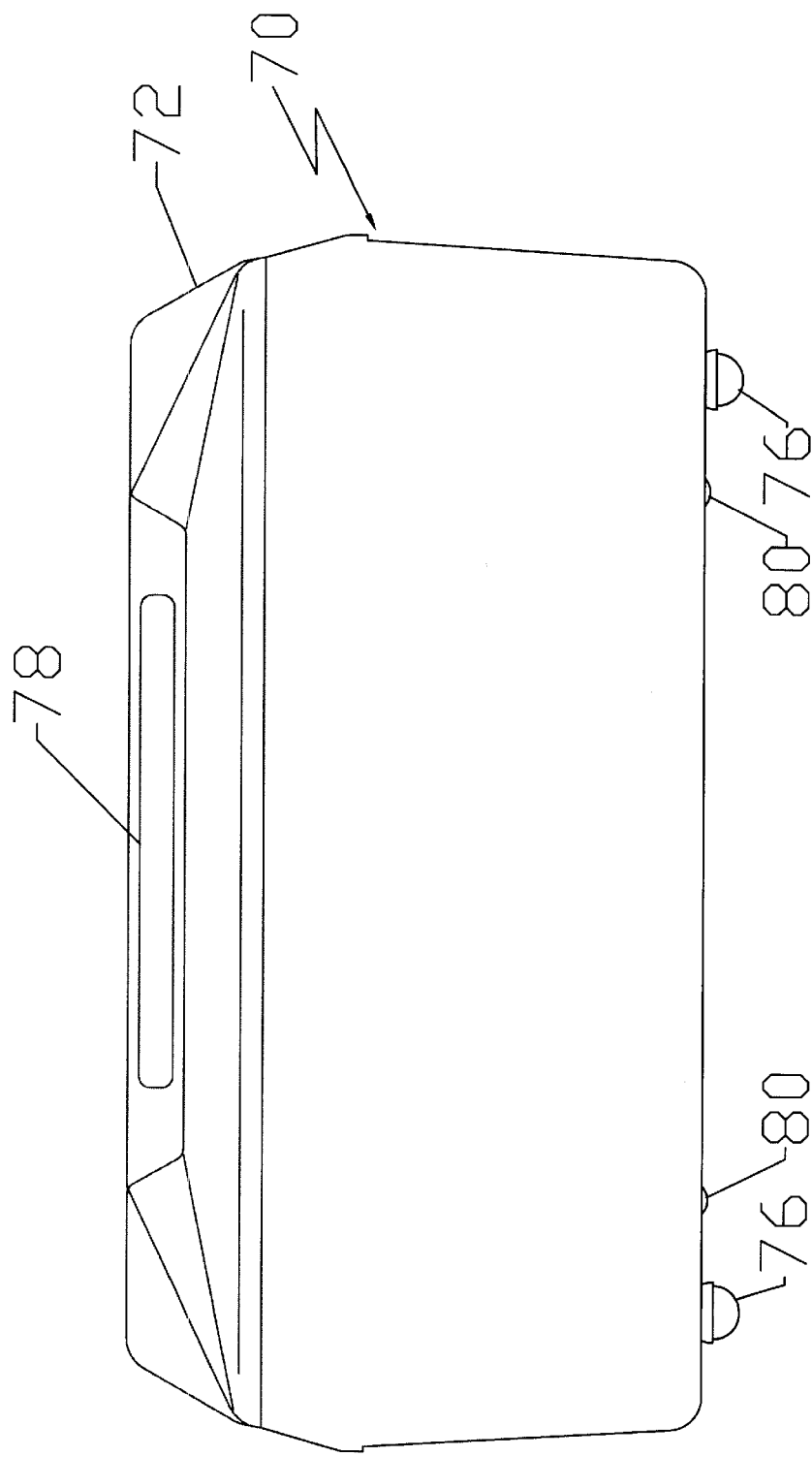
FIG. 17 is a front elevational view showing a trunk or case supported by the carrier assembly.
Figure 18:
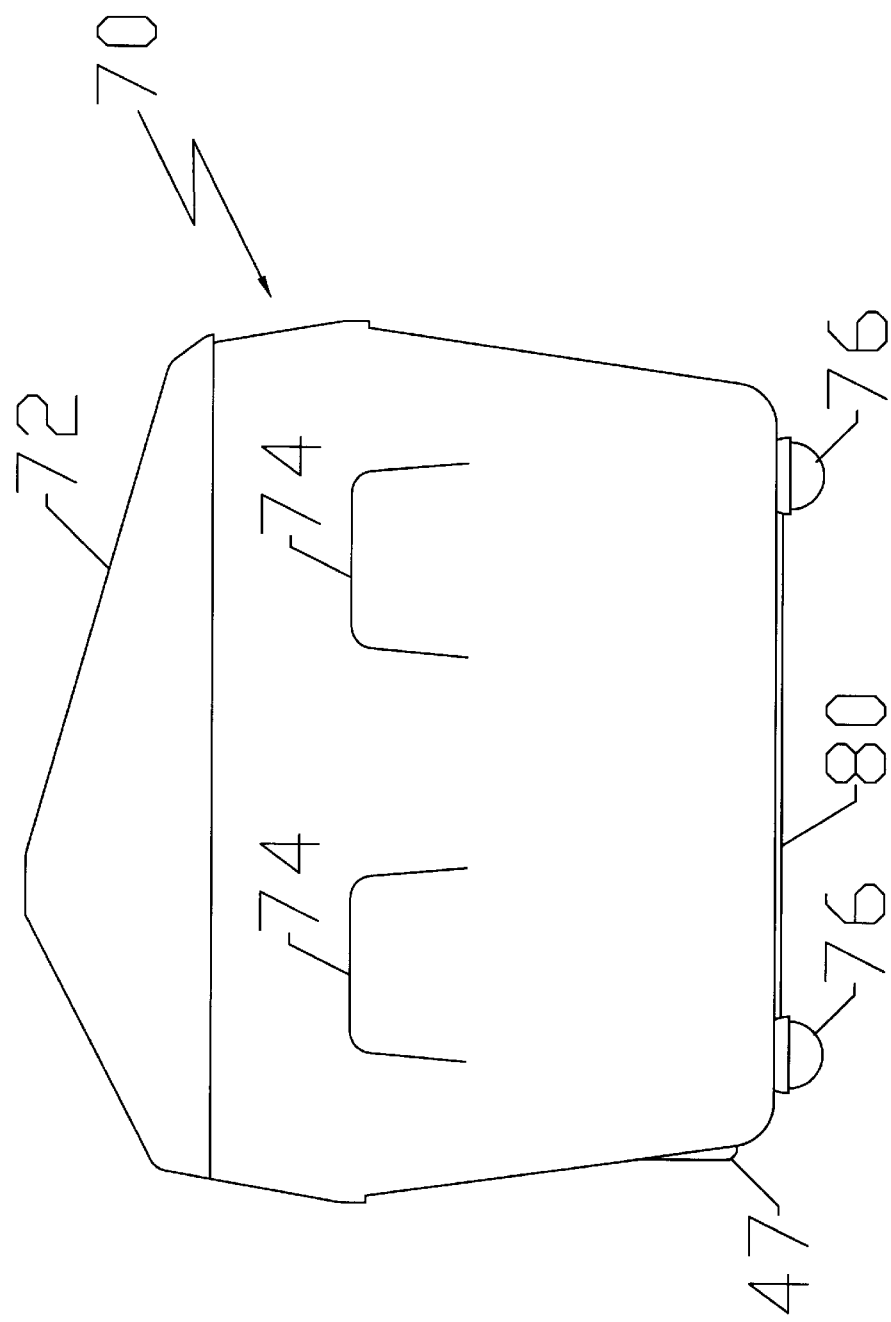
FIG. 18 is a side elevational view of the assembly of FIG. 17.

FIGS. 15 and 16 illustrate the versatility of the carrier by providing one or more modular components. As shown in the drawings, tines 37 are tubular, and extension 64, having tubular tines or rails 65, is telescopically engaged with tines 34. Extension 64 has vertical, tubular projections 66, which may be useful when it is desirable to elevate the conjoined platform. Thus, a second platform 38, having tubular tines 68, which are angled to provide for a horizontally disposed platform, telescopically engages with the projections 66. Where desired, one or more of the modular platform components may be provided with transverse racks 69 extending between the tines 37 and 68 for supporting bicycles or other equipment.

Figure 19:
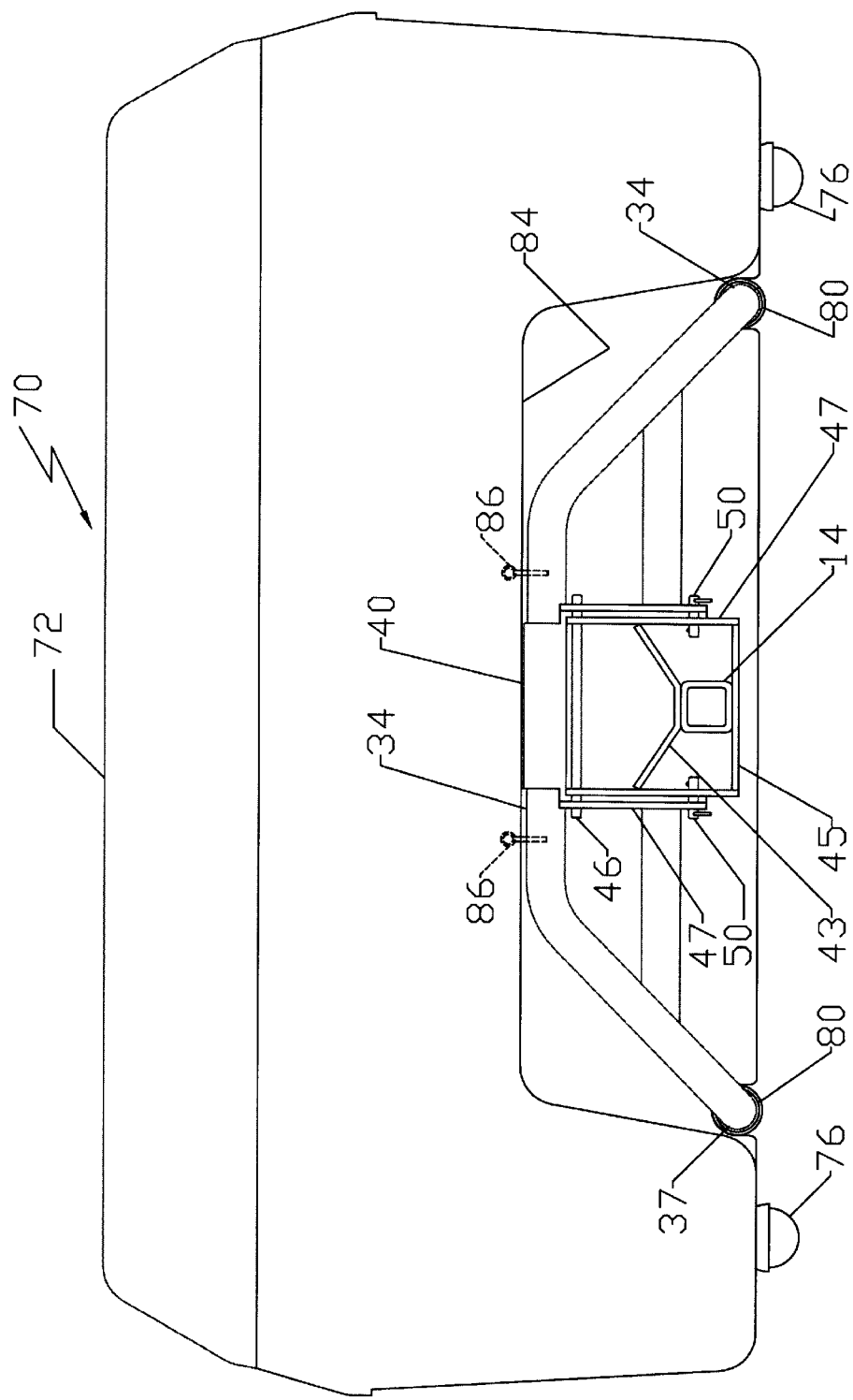
FIG. 19 is a front elevation view of the assembly of FIG. 17 and showing the connection of the platform or carrier with the trunk.

In another modification of the invention, a case or trunk is supported by the carrier. As shown in FIGS. 17 through 20, a case, trunk, or the like, indicated generally by the numeral 70, formed of a durable plastic, fiberglass, or other suitable material, is provided with a hinged cover or lid 72, handles 74, and casters 76 for easy moving when the trunk is disconnected from the carrier. Also, the trunk is provided with a reflector light or electric lights 78, which can be connected to the electrical system of the vehicle, for turn signals, back-up light, or brake light. The trunk is provided with elongated, parallel channels 80, which preferably are open at one end only. Channels 80 are co-operable with, or are designed to accommodate, the tines 37 extending from the yoke 34 of the carrier. Thus, the tines are inserted into the channels, which should be of sufficient length to provide adequate support for the trunk. The forward wall 82 of the trunk 70 (the wall facing the vehicle) is recessed at 84, as best shown in FIGS. 19 and 20, to accommodate the carrier portion comprising the platform and yoke, thereby providing a snug fit with the carrier when the tines have been inserted their full length. In order to better secure the trunk in place, and to provide for an anti-theft means, the wall of the recess 84 and the yoke 34 are provided with aligned holes, and a locking pin 86 extends from the interior of the trunk and through the holes. (See FIGS. 19 and 20.) The trunk is desirable in that it not only increases the load carrying capacity of the carrier, but also provides a means to protect any items from the elements, or to provide protection for perishable items.

It will be observed that by reason of our invention, the carrier assembly provides several advantages, including a facile and versatile means for adjoining a carrier to a vehicle. Further, a cantilevered carrier extending from the mount turns with the vehicle, and therefore eliminates the back-up problem commonly associated with a wheeled trailer attached to the vehicle. Further, it should be understood that the foregoing detailed description has been given for clearness of understanding only, and no unnecessary limitations should be understood therefrom, as modifications will be obvious to those skilled in the art.

What is claimed is:

1. A carrier assembly for a vehicle having a standard receiver hitch, comprising:
   (a) a hitch connecting means for connecting with said receiver hitch and projecting outwardly therefrom;
   (b) a plate member having opposed first and second facings and secured at one facing thereof to said hitch connecting means, said plate member being disposed outwardly from and transversely to said hitch connecting means;
   (c) a retaining means affixed to the opposite facing of said plate member; and
   (d) a generally horizontally disposed platform comprising spaced, parallel tubular members depending from said retaining means.

2. A carrier assembly for a vehicle with a standard receiver hitch, comprising:
   (a) a hitch connecting means for connecting with said receiver hitch and projecting outwardly therefrom;
   (b) a plate member depending from and disposed transversely to said hitch connecting means, said plate member having a substantially planar facing disposed outwardly from said hitch connecting means; and
   (c) a yoke affixed to said planar facing of said plate member and having spaced parallel tines extending downwardly and outwardly from said plate member thereby forming a generally horizontally disposed platform.

3. A carrier assembly for a vehicle according to claim 2 further including a second carrier adapted to be engaged with said tines.

4. A carrier assembly for a vehicle having a standard receiver hitch, comprising:
   (a) a hitch connecting means for connecting with said receiver hitch and projecting outwardly therefrom;
   (b) a vertically disposed first plate affixed to said hitch connecting means;
   (c) a vertically disposed second plate adjustably mounted to said first plate thereby allowing said second plate to be adjusted vertically relative to the hitch connecting means, said second plate having a substantially planar, outwardly disposed facing;
   (d) a retaining means affixed to said outwardly disposed facing of said second plate; and
   (e) a generally horizontal platform depending from said retaining means.

5. A carrier assembly according to claim 4 wherein said retaining means comprises a yoke having (a) a substantially horizontal section, at least a portion of which is affixed to said outwardly disposed facing of said second plate, and (b) downwardly and outwardly spaced parallel tines, thereby forming said generally horizontally disposed platform.

6. A carrier assembly for a vehicle with a standard receiver hitch, comprising:
   (a) a hitch connecting means for connecting with said receiver hitch and projecting outwardly therefrom;
   (b) a vertically disposed first plate affixed to said hitch connecting means, said first plate having substantially parallel side flanges formed perpendicularly to said first plate at the marginal edges thereof;
   (c) a vertically disposed second plate mounted to said first plate, said second plate having substantially parallel side flanges formed perpendicularly at the marginal edges thereof, and the upper marginal edge of said second plate terminating with a downwardly turned, outwardly facing flange forming a channel having an inverted concave configuration;
   (d) said first plate and said second plate appropriately sized so that said second plate will nest with said first plate; and
   (e) a yoke having a contoured part conforming to the concavity of said channel and adapted to be inserted in said channel and affixed to said second plate, said yoke having downwardly depending and outwardly projecting tines.

7. A carrier assembly according to claim 1 wherein said retaining means comprises a yoke having an inverted U-shape with a substantially horizontal mid-section, and a substantial portion of the horizontal mid-section and downwardly depending members of said yoke being affixed to said plate member, and said yoke having outwardly extending spaced parallel tines depending therefrom thereby forming said platform.

8. A carrier assembly according to any one of claims 2, 5, 6 or 7 wherein said tines are open-ended, and a second carrier is adapted to be telescopically engaged with said tines.

9. A carrier assembly according to claim 6 wherein said side flanges of said first plate have coaxially aligned recesses, and an elongated connecting member extending from each of said side flanges of said second plate, each of said recesses adapted to receive said connecting member and thereby hold said second plate in abutting relation with said first plate.

10. A carrier assembly according to claim 9 wherein said connecting member is an elongated rod extending between said side flanges of said second plate.

11. A carrier assembly according to any one of claims 1, 2, 3, or 7, wherein said hitch connecting means has a longitudinal opening adaptable for telescopic engagement with said receiver hitch, and further said plate member has an opening through which protrudes said hitch connecting means adaptable for accommodating a second receiver hitch.

12. A carrier assembly according to any one of claims 4–6, 9 or 10 wherein said hitch connecting means has a longitudinal opening adaptable for telescopic engagement with said receiver hitch, and further said first and second plates have aligned openings through which protrudes said hitch connecting means adaptable for accommodating a second receiver hitch.

13. A carrier assembly according to any one of claims 1, 2, 4, or 7 wherein said platform further includes at least one horizontally disposed brace.

14. A carrier assembly according to claim 11 wherein said platform has at least one horizontally disposed brace.

15. A carrier assembly according to any one of claims 2, 3, 5, 6, 9 or 10 and further including at least one horizontal brace extending between said tines and abutting said second plate.

16. A carrier assembly according to any one of claims 6, 9 or 10 wherein said second plate, having affixed thereto said yoke and said platform, can be disconnected from said first plate when said carrier assembly is not in use.

17. A carrier assembly according to any one of claims 2, 5, 6, 7, 9 or 10 and further including a cargo case having elongated channels for slidable engagement with said tines.

18. A carrier assembly according to claim 6 wherein said first plate has a substantially planar surface disposed outwardly from said hitch connecting means, and said second plate has a substantially planar surface adjoined in abutting relationship with said planar surface of said first plate when said plates are nested.

19. A carrier assembly according to claim 18 wherein said hitch connecting means has a longitudinal opening adaptable for telescopic engagement with said receiver hitch, and further said plate members have aligned openings through which protrudes said hitch connecting means adaptable for accommodating a second receiver hitch.

20. A carrier assembly according to claim 19 and further including a cargo case having elongated channels for slidable engagement with said tines.

21. A carrier assembly for a vehicle with a standard receiver hitch, comprising:

(a) a hitch connecting means for connecting with said receiver hitch and projecting outwardly therefrom;

(b) a vertically disposed first plate affixed to said hitch connecting means, said first plate having (i) a substantially planar surface disposed outwardly from said hitch connecting means, (ii) substantially parallel side flanges and a bottom flange formed perpendicularly to said first plate at the marginal edges thereof, and (iii) said side flanges having aligned recesses;

(c) a vertically disposed second plate mounted to said first plate, said second plate having (i) a substantially planar surface disposed for abutting relationship with said planar surface of said first plate, (ii) substantially parallel side flanges formed perpendicularly at the marginal edges thereof, and the upper marginal edge of said second plate terminating with a downwardly turned, outwardly facing flange forming a channel having an inverted concave configuration, and (iii) an elongated rod extending between said side flanges of said second plate;

(d) said first plate and said second plate appropriately sized so that said second plate will nest with said first plate, and said recesses being adapted to receive said rod and thereby retain said planar surfaces of said first and second plates in abutting relationship;

(e) a yoke having a contoured part conforming to the concavity of said channel and adapted to be inserted in said channel and affixed to said second plate, said yoke having downwardly depending and outwardly projecting tines forming a generally horizontal platform.

* * * * *